(12) United States Patent
Jones, III et al.

(10) Patent No.: US 8,543,428 B1
(45) Date of Patent: Sep. 24, 2013

(54) COMPUTERIZED SYSTEM AND METHOD FOR ESTIMATING LEVELS OF OBESITY IN AN INSURED POPULATION

(75) Inventors: Creed Farris Jones, III, Louisville, KY (US); Diana J. Beasley, Louisville, KY (US); Farooq Azam, Porspect, KY (US); John Louis Kucera, Louisville, KY (US); Carol Jeanne McCall, Libertyville, IL (US)

(73) Assignee: Humana Inc., Louisville, KY (US)

( * ) Notice: Subject to any disclaimer, the term of this patent is extended or adjusted under 35 U.S.C. 154(b) by 853 days.

(21) Appl. No.: 12/635,043

(22) Filed: Dec. 10, 2009

(51) Int. Cl.
*G06Q 40/00* (2012.01)

(52) U.S. Cl.
USPC .......................................................... 705/4

(58) Field of Classification Search
USPC .......................................................... 705/4
See application file for complete search history.

(56) References Cited

U.S. PATENT DOCUMENTS

| | | | | |
|---|---|---|---|---|
| 6,322,504 B1 * | 11/2001 | Kirshner | ...................... | 600/300 |
| 7,194,301 B2 * | 3/2007 | Jenkins et al. | .................... | 607/2 |
| 8,024,204 B1 * | 9/2011 | Goral | ................ | 705/4 |
| 8,388,532 B2 * | 3/2013 | Morgan | ........................ | 600/301 |
| 2008/0051679 A1 * | 2/2008 | Maljanian | .................... | 600/587 |
| 2008/0294370 A1 * | 11/2008 | Kriger | .......................... | 702/173 |
| 2011/0105852 A1 * | 5/2011 | Morris et al. | ................. | 600/300 |
| 2012/0116801 A1 * | 5/2012 | Hu et al. | .......................... | 705/2 |

OTHER PUBLICATIONS

Kuriyama, S. et al. "Medical Care Expenditure Associated with Body Mass Index in Japan: The Ohsaki Study." International Journal of Obesity and Related Disorders 26.8 (2002): 1069-74 (6 pages).*
Rowald, Laura A. "Relationships Among Body Mass Index, Physical Activity Status, and Health-Related Quality of Life in Employed Adults", Diss. Southern Illinois University Carbondale, 2006. 3244485 (124 pages).*
Libann: Creating a Feature Vector. May 15, 2003. http://www.nongnu.org/libann/doc/libann_3.html>(2 pages).*

* cited by examiner

*Primary Examiner* — Elda Milef
(74) *Attorney, Agent, or Firm* — Standley Law Group LLP

(57) ABSTRACT

A computerized system and method for estimating levels of obesity in an insured population using claims data. The model uses health risk assessment data comprising age, height, and weight information as well as information about health conditions and health behaviors for a member population. Claims data is used to train a two-stage model on the member population. The first stage comprises a support vector machine, a rule-based module, and a generalized linear model that estimates the probability of obesity. The second stage comprises a regression neural network that operates on the output of the first stage and a subset of the input feature vector. Cost and utilizations in these areas, along with overall health measures as well as demographics and social factors, are inputs to a set of pattern recognition engines that perform regression. The output is the estimated body mass index of the member.

25 Claims, 4 Drawing Sheets

COMPUTERIZED SYSTEM AND METHOD FOR ESTIMATING LEVELS OF OBESITY IN AN INSURED POPULATION

CROSS-REFERENCE TO RELATED APPLICATIONS

None.

FIELD OF THE INVENTION

The present invention relates generally to computerized health modeling systems. In particular, the present invention is a computerized system and method for estimating levels of obesity in an insured population.

BACKGROUND OF THE INVENTION

For many years now, U.S. employers and other groups that offer health insurance and benefits to covered individuals have seen annual increases in their health care costs. As health care costs continue to rise, employers and groups that offer health insurance are trying to understand why costs are increasing and what they can do to control costs. Because costs are tied to the claims that employees or group members file under the health care plan, analysis of claim data may help employers and groups understand why costs are increasing.

Although an analysis of applicable claim data is helpful in understanding, and, therefore, controlling health care costs, performing an analysis is not necessarily a straightforward task. For example, administrative claim data does not contain information on an insured's height and weight, and yet obesity (as measured by the Body Mass Index) is a key contributor to health and wellness and, therefore, health care costs. Many health conditions are related to obesity and so it is useful to understand the levels or degrees of obesity present in a population. The levels or degrees of obesity in an insured population can influence the claims that are made under a health care plan and help a sponsor understand factors that may be contributing to the costs. However, without the height and weight data for the individuals covered by the plan, it is difficult to determine the level or degree of obesity among the individuals, and therefore, whether health care costs under the plan are potentially attributable to obesity-related health conditions. There is a need for a computerized system and method for estimating the presence and levels or degrees of obesity in an insured population using claims data.

SUMMARY OF THE INVENTION

The present invention is a computerized system and method for estimating levels of obesity in an insured population using claims data. An obesity model that is a part of the computerized system and method infers obesity in members of a health plan, based on their medical and prescription drug claims history.

The model is developed using "Health Risk Assessment" (HRA) data. A health care plan provider asks members of a health plan to voluntarily complete a health risk assessment, which is a questionnaire or survey for collecting personal and health information. Individuals that complete a HRA provide age, height, and weight information as well as information about health conditions and health behaviors. Even a relatively small set of HRA data from individuals may be used to develop a model relating obesity to claims data. This model may then be used to estimate the level of obesity in members for which only basic claims data is available.

In an example embodiment, 36 months of claims data, along with basic demographic data, was used to train a two-stage model on a population of approximately 100,000 members. From administrative claims data, activity in a number of key diagnostic areas (e.g., 38) related to obesity is computed. Cost and utilizations in these areas, along with overall health measures such as co-morbidity and chronic conditions, as well as member demographics and social factors, are inputs to a set of pattern recognition engines that perform regression. The first stage comprises a support vector machine, a rule-based module, and a generalized linear model that estimates the probability of obesity. The second stage comprises a regression neural network that operates on the output of the first stage and a subset of the input feature vector. The model may be implemented in MATLAB using standard techniques.

The output of the model is the estimated BMI of the member. Using this model, it is possible to infer the obesity state (Body Mass Index≥30) of a test population to 81% accuracy, corresponding to an area under the ROC curve (or c-statistic) of 0.82.

DETAILED DESCRIPTION

Figure 1:
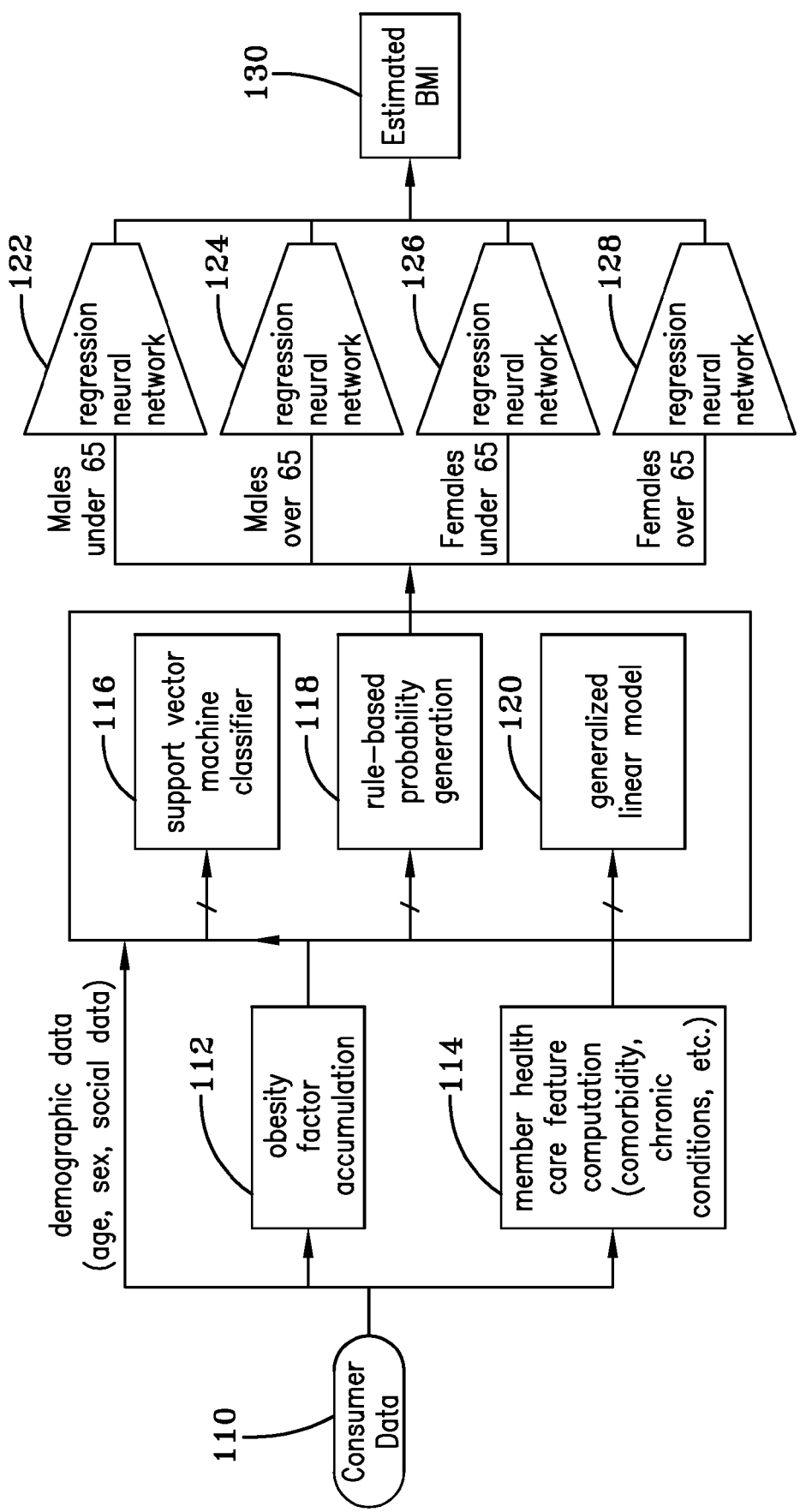
FIG. 1 is an architecture diagram of an example embodiment of the present invention.

The computerized system and method of the present invention may be used to determine whether a particular consumer is obese, based on his or her health and claims history and basic demographic data. Obesity is measured by the Body Mass Index (BMI) for an individual. BMI is calculated as the weight in kilograms divided by the square of the height in meters:

$$BMI = \frac{\text{weight (in kg)}}{[\text{height (in m)}]^2} \quad (1)$$

BMI readings are categorized into several levels, though the threshold values are not universally consistent.[1] BMI of 30 or over is generally considered obese, while many people consider a BMI of 38 (or 40 in many cases) or over as more serious—"morbidly obese."[2] A growing consensus comprehends three levels of obesity:

Obese I: BMI of 30 and over, up to 35;
Obese II: BMI of 35 and over, up to 40; and
Obese III: BMI of 40 and over This convention was adopted for the purposes of the model described herein.

Data Preprocessing

In an example embodiment, the data available for use of the model falls into four categories as shown in Table 1.

TABLE 1

Model Data Categories

| | |
|---|---|
| Member Data | age, sex, address and coverage information |
| Medical Claims | costs, dates of service, comorbidities, diagnosis and MCC (major clinical condition) codes |
| Prescription Drug Claims | costs, dates of service and drugs prescribed |

TABLE 1-continued

Model Data Categories

| | |
|---|---|
| Social Data | averages in the census block area for metrics such as racial distribution, income, employment, education and family size |

Members that do not file claims with the health plan administrator may be excluded from the development and application of the model. An obesity model is unlikely to be of use for such members as there is a likelihood that the members are not obese, and therefore, do not have apparent health problems.

In order to develop an accurate model, a population for which actual BMI data is available is used. The data is obtained from the Health Risk Assessment (HRA), which many members complete during a benefits enrollment process. The HRA may be implemented as an online tool that asks a series of health-related questions such as height and weight, known health problems, tobacco and alcohol use, etc. From this self-reported height and weight data, the member's BMI can be computed.

Typically, using HRA data requires explicit permission from the member to use his or her data. Thus, the population used for model development may comprise those members that meet the following conditions:
1. Member data including age and sex;
2. A known address for which valid census data is available;
3. At least one BMI reading from an HRA;
4. Permission granted to use the HRA data in research; and
5. At least one medical or prescription claim in the period under consideration.

In an example embodiment, approximately 100,000 members satisfied all five conditions and these members formed the development population for the model. Claims and HRA data spanned a 36-month period, though not all consumers were members for the entire period.

The BMI data was obtained from HRAs completed by members on-line. The height and weight are self-reported, and BMI is calculated from them. One concern is the accuracy of the self-reported height and (especially) weight. However, internal studies indicate that self-reported BMI data are surprisingly accurate.

Some members completed the HRA yearly, while others did not complete the HRA at all or were not members for the entire period under consideration. Therefore, the multiple BMI calculations may be treated differently. Experimentation suggests that the most accurate and most representative BMI value is the last reported. Therefore, this value is used in the model. Operationally, the most common scenario is to infer members' obesity state at the most recent point in time, with the longest claims history possible. Thus, use of the last reported BMI for training is appropriate.

The complete feature vector comprises the member's age and gender, the cost-based intensity and number of claims in each of the 38 obesity factor areas, the social factors listed above, the total number of claims in all 38 areas, the Charlson Comorbidity Index for the member and a set of chronic condition tags (indicating conditions such as diabetes and depression). This data is used as the input to the obesity inference model. The complete feature vector is outlined in Appendix A.

Obesity Factors

The primary modeling technique used in the example embodiment was the feed-forward neural network. Neural networks of this type are suited for inputs that are vectors of continuous variables (a few non-continuous variables such as gender are permissible). However, nearly all of the raw data from claims and member information are unordered categorical quantities, which could make the training and use of a model awkward.

To produce some continuous variables from claims data a number of diagnosis areas related to obesity are determined. These variables are called obesity factors. Using clinical information and insight, 38 different factors have been identified and are shown in Table 2. Each of these factors has a number of ICD-9 diagnosis codes, prescription drug codes, and major clinical condition codes associated with it. If a member has at least one claim that contains a code related to a factor, then the individual is considered as having activity in that factor area.

TABLE 2

Obesity Factors

| # | Obesity factor |
|---|---|
| 1 | Polycystic ovary syndrome |
| 2 | Fatty liver disease |
| 3 | Dysmetabolic syndrome X |
| 4 | Gall bladder disease |
| 5 | Pancreatitis and bile duct obstruction |
| 6 | Abnormal weight gain |
| 7 | Cushing's syndrome |
| 8 | Intestinal malabsorption |
| 9 | Breast cancer |
| 10 | Osteoarthrosis |
| 11 | Hypothyroidism |
| 12 | Goiter (assoc. with hormonal imbalance) |
| 13 | Hypoglycemia and other glycogen issues |
| 14 | "just not feeling good" |
| 15 | Lumbago |
| 16 | Eating disorders |
| 17 | Sleep problems |
| 18 | Migraines |
| 19 | Head pain |
| 20 | Fat in various parts of the body |
| 21 | Edema (fluid retention) |
| 22 | Mental stress, depression and anxiety |
| 23 | Back problems |
| 24 | Specific fatty breast issues (females) |
| 25 | Other fatty breast issues (females) |
| 26 | Colon and other associated cancers |
| 27 | Male breast cancer |
| 28 | Neoplasm of the master hormonal gland |
| 29 | Vitamin deficiency and absorption issues |
| 30 | Varicose veins |
| 31 | Lymphangitis |
| 32 | Phlebitis |
| 33 | Hernia tendency |
| 34 | Asthma |
| 35 | Diabetes |
| 36 | Hypertension |
| 37 | Abnormal lipid panel |
| 38 | Obesity (as a diagnosis) |

In order to place a measure on the intensity of the activity for a given factor, the cost associated with the relevant claim is used. To remove, as much as possible, the effect of variations such as deductible amounts and charged amounts, the cost used is the allowed amount. So, if a claim has either a diagnosis, drug or MCC code associated with one of the 38 factors, the amount for that claim is added to that factor area for that member. Note that the mapping from diagnoses or drugs to obesity factors is a many-to-one mapping; in this set of factors, there is no diagnosis, drug or MCC code that maps to more than one obesity factor.

However, a medical claim may specify up to eight secondary diagnoses in addition to the primary diagnosis. It has been observed that some diagnoses rarely appear as the primary (notably obesity). Wherever more than one diagnosis appears, the allowed amount is apportioned among the relevant diagnoses. The specific method used is as follows: 80% of the cost is assigned to the primary diagnosis, while the remaining 20% is divided among secondary diagnoses 2-5 (as many as are present).

This apportionment process results in a set of 38 factors for each individual, representing the intensity of activity for the member in each area. The cost alone does not convey information on the frequency of the activity—one claim for $1000 has the same cost as ten claims, each for $100. In order to carry along some indication of the frequency of usage, also recorded is the number of claims associated with each factor.

Cost data in each obesity-related factor is totaled for the period under consideration and normalized by dividing by the number of months that the member was covered ("enrolled"). Thus, Per Member Per Month (PMPM) cost amounts are used as the actual features. Financial information such as cost often results in difficult numeric features due to the wide range of the variable. It is possible to have claims that cost less than a dollar, as well as claims that cost in the hundreds of thousands of dollars. To compress the range of the variable somewhat, a logarithmic function is applied to all cost information. The function used is the natural logarithm of the absolute value of the input variable, plus 1, with the sign of the input variable:

$$\text{Var}_{out} = \text{sgn}(\text{Var}_{in})\ln(|\text{Var}_{in}|+1) \quad (2)$$

Many studies have shown a link between social factors, such as age and income, and obesity.[3] Sufficient information on members at an individual level may not be available to determine this level of data. However, addresses are available, and from US Census Bureau statistics, it is possible to find the averages of many social statistics for their near neighborhoods (or census blocks). The data is not specific to the members under consideration, but it can be regarded as an estimate of the social data for the member. Census data contains 379 fields of information for these census blocks. The fields used in this study are shown in Table 3.

TABLE 3

Social Factors

| # | Social factor |
|---|---|
| 1 | Race: % white |
| 2 | Race: % black |
| 3 | Race: % native American |
| 4 | Race: % Asian |

TABLE 3-continued

Social Factors

| # | Social factor |
|---|---|
| 5 | Race: % other |
| 6 | Ethnicity: % Hispanic |
| 7 | Ethnicity: % non-Hispanic |
| 8 | Economic: % employed |
| 9 | Economic: % in armed forces |
| 10 | Economic: % not in labor force |
| 11 | Social: % never married |
| 12 | Social: % currently married |
| 13 | Social: % separated |
| 14 | Social: % widowed |
| 15 | Social: % divorced |
| 16 | Education: % <grade 9 |
| 17 | Education: % grades 9-12 |
| 18 | Education: % high school diploma |
| 19 | Education: % some college |
| 20 | Education: % Associate's degree |
| 21 | Education: % Bachelor's degree |
| 22 | Education: % graduate degree |
| 23 | Economic: aggregate income |
| 24 | Social: average household size |
| 25 | Social: median age |
| 26 | Economic: unemployment rate |
| 27 | Economic: per-capita income |
| 28 | Economic: median household disposable income |

Charlson Comorbidity Index

The ability to stratify or control for varying levels of disease severity and co-morbid illness is important in obtaining valid inferences from outcome studies. Charlson[4] developed a prospectively applicable taxonomy method for classifying co-morbid conditions that alter the risk of mortality. The Charlson Index contains categories of co-morbidity with each category having an associated weight, which is based on the adjusted risk of one-year mortality. The weighted index was developed to take into account both the number and the seriousness of co-morbid diseases. The overall co-morbidity score reflects the increased likelihood of one-year mortality: the higher the score, the more severe the burden of co-morbidity. Deyo[5] adapted the original clinical Charlson Index designed for use with medical records to use administrative databases utilizing ICD-9-CM diagnoses codes to define the co-morbid conditions. The co-morbidity index for a member is the sum of all weights for all conditions exhibited during the study period, as detected by the ICD-9 diagnosis codes present in medical claims (see Table 4). It is useful to the model as a single metric indicative of the general health of the individual.

TABLE 4

Codes and Weights for Charlson Co-morbidity Index

| Weight | Conditions | ICD-9 codes | Coding Descriptions |
|---|---|---|---|
| 1 | Myocardial infarct | 410, 411 | (410.XX): Acute myocardial infarction<br>(411.XX): Other acute and subacute forms of ischemic heart disease |
| 1 | Congestive heart failure | 398, 402, 428 | (398.XX): Other rheumatic heart disease;<br>(402.XX): Hypertensive heart disease;<br>(428.XX): Heart Failure |
| 1 | Peripheral vascular disease | 440-447 | (440.XX): Atherosclerosis;<br>(441.XX): Aortic aneurysm and dissection<br>(442.XX): Other aneurysm;<br>(443.XX): Other peripheral vascular disease<br>(444.XX): Arterial embolism and thrombosis;<br>(445.XX): Atheroembolism<br>(446.XX): Polyarteritis nodosa and allied conditions;<br>(447.XX): Other disorders of arteries and arterioles |
| 1 | Dementia | 290, 291, | (290.XX): Dementias; |

TABLE 4-continued

Codes and Weights for Charlson Co-morbidity Index

| Weight | Conditions | ICD-9 codes | Coding Descriptions |
|---|---|---|---|
| | | 294 | (291.XX): Alcohol-induced mental disorders<br>(294.XX): Persistent mental disorders due to conditions classified elsewhere |
| 1 | Cerebrovascular disease | 430-433, 435 | (430.XX): Subarachnoid hemorrhage;<br>(431.XX): Intracerebral hemorrhage<br>(432.XX): Other and unspecified intracranial hemorrhage;<br>(433.XX): Occlusion and stenosis of precerebral arteries;<br>(435.XX): Transient cerebral ischemia |
| 1 | Chronic pulmonary disease | 491-493 | (491.XX): Chronic bronchitis;<br>(492.XX): Emphysema;<br>(493.XX): Asthma |
| 1 | Connective tissue disease | 710, 714, 725 | (710.XX): Diffuse diseases of connective tissue<br>(714.XX): Rheumatoid arthritis and inflammatory polyarthropathies<br>(725.XX): Polymyalgia rheumatica |
| 1 | Ulcer disease | 531-534 | (531.XX): Gastric Ulcer;<br>(532.XX): Duodenal Ulcer;<br>(533.XX): Peptic ulcer site unspecified<br>(534.XX): Gastrojejunal ulcer |
| 1 | Mild liver disease | 571, 573 | (571.XX): Chronic liver disease and cirrhosis;<br>(573.XX): Other disorders of liver |
| 2 | Hemiplegia | 342, 434, 436, 437 | (342.XX): Hemiplegia and hemiparesis;<br>(434.XX): Occlusion of cerebral arteries<br>(436.XX): Acute but ill-defined cerebrovascular disease;<br>(437.XX): Other and ill-defined cerebrovascular disease |
| 2 | Moderate or severe renal disease | 403, 404, 580-586 | (403.XX): Hypertensive kidney disease;<br>(404.XX): Hypertensive heart and kidney disease<br>(580.XX): Acute glomerulonephritis;<br>(581.XX): Nephrotic syndrome<br>(582.XX): Chronic glomerulonephritis;<br>(583.XX): Nephritis and nephropathy not specified as acute or chronic;<br>(584.XX): Acute renal failure;<br>(585.XX): Chronic kidney disease (ckd)<br>(586.XX): Renal failure unspecified |
| 2 | Diabetes | 250 | (250.XX): Diabetes mellitus |
| 2 | Any tumor | 140-195 | |
| 2 | Leukemia | 204-208 | (204.XX): Lymphoid leukemia;<br>(205.XX): Myeloid leukemia;<br>(206.XX): Monocytic leukemia;<br>(207.XX): Other specified leukemia;<br>(208.XX): Leukemia of unspecified cell type |
| 2 | Lymphoma | 200, 202, 203 | (200.XX): Lymphosarcoma and reticulosarcoma<br>(202.XX): Other malignant neoplasms of lymphoid and histiocytic tissue<br>(203.XX): Multiple myeloma and immunoproliferative neoplasms |
| 3 | Moderate or severe liver disease | 070, 570, 572 | (070.XX): Viral hepatitis<br>(570.XX): Acute and subacute necrosis of liver<br>(572.XX): Liver abscess and sequelae of chronic liver disease |
| 6 | Metastatic solid tumor | 196-199 | (196.XX): Secondary and unspecified malignant neoplasm of lymph nodes<br>(197.XX): Secondary malignant neoplasm of respiratory and digestive systems<br>(198.XX): Secondary malignant neoplasm of other specified sites<br>(199.XX): Malignant neoplasm without specification of site |

Chronic Condition Metrics

There are certain chronic conditions that are extremely important to overall member health, though they may not be as directly related to obesity, that are included in the model. These chronic conditions are chronic kidney disease, depression, diabetes, HIV, hypertension, and certain cancers. Criteria have been developed for detecting the presence and severity of these conditions from claims data. Though there is some correlation with the 38 obesity factors discussed above, additional useful information is present, and the severity of each of these six chronic conditions are included in the feature vector.

Total Number of Claims

The use of total cost as an indication of the "intensity" of health care usage is limited. While a single claim with a high cost does indicate a significant health event, a large number of claims with relatively small cost is characteristic of many types of illnesses (e.g., frequent monitoring of serious clinical conditions). To reflect this type of utilization in the feature vector, the number of claims in each obesity-related area is totaled, as well as the total number of medical and prescription drug claims of any type. These claims counts are included in the feature vector.

Overall Architecture

Referring to FIG. 1, an architecture diagram of an inference model for an example embodiment is shown. The task may be cast as a regression problem. From a set of known inputs, the unknown output function value is estimated (in this case, the member's BMI). The model itself is trained on known data—members whose BMI is known from their HRA responses, with their corresponding claims histories. During this training phase, internal coefficients are set to provide the best approximation to the true output (BMI) in terms of the input (feature vector). In operation, claims histories for new members are submitted to the model and the output is taken as an estimate of their actual BMI. With a sufficiently large and representative training set, the model "generalizes" to give good approximation of each member's BMI.

Figure 2A:
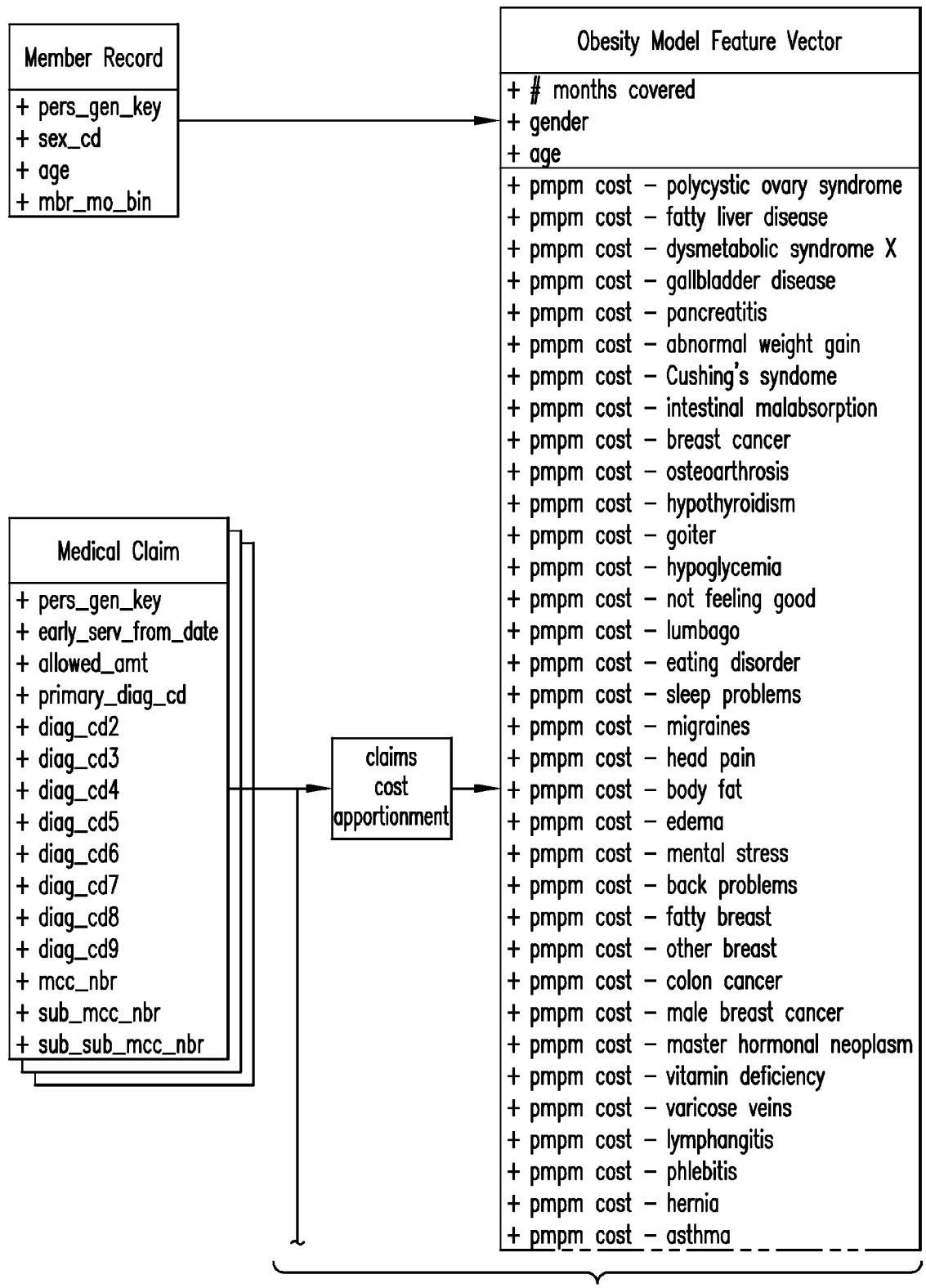
FIG. 2 is a schematic representation of a feature vector computation for an example embodiment of the present invention.
Figure 2B:
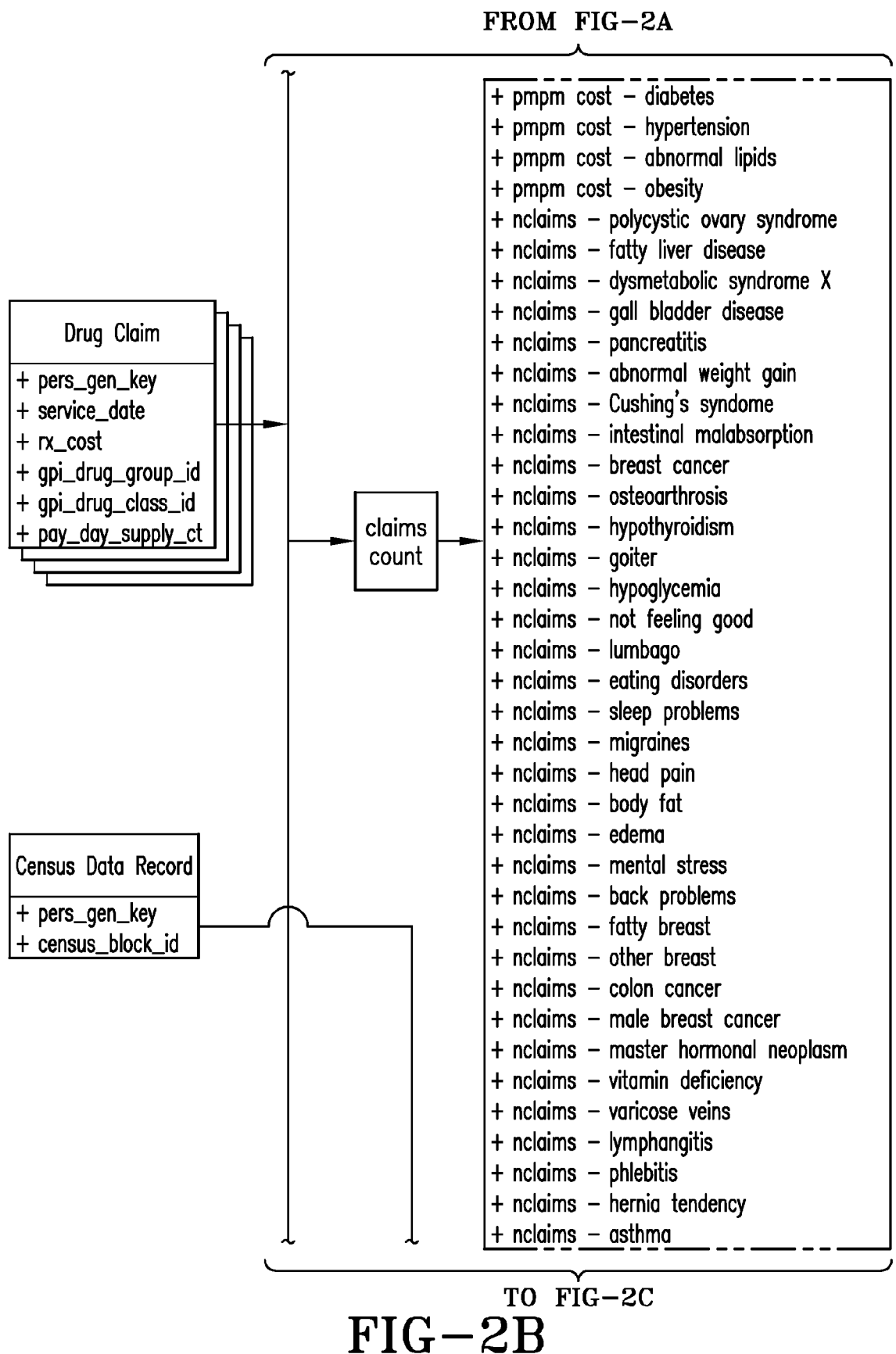
Figure 2C:
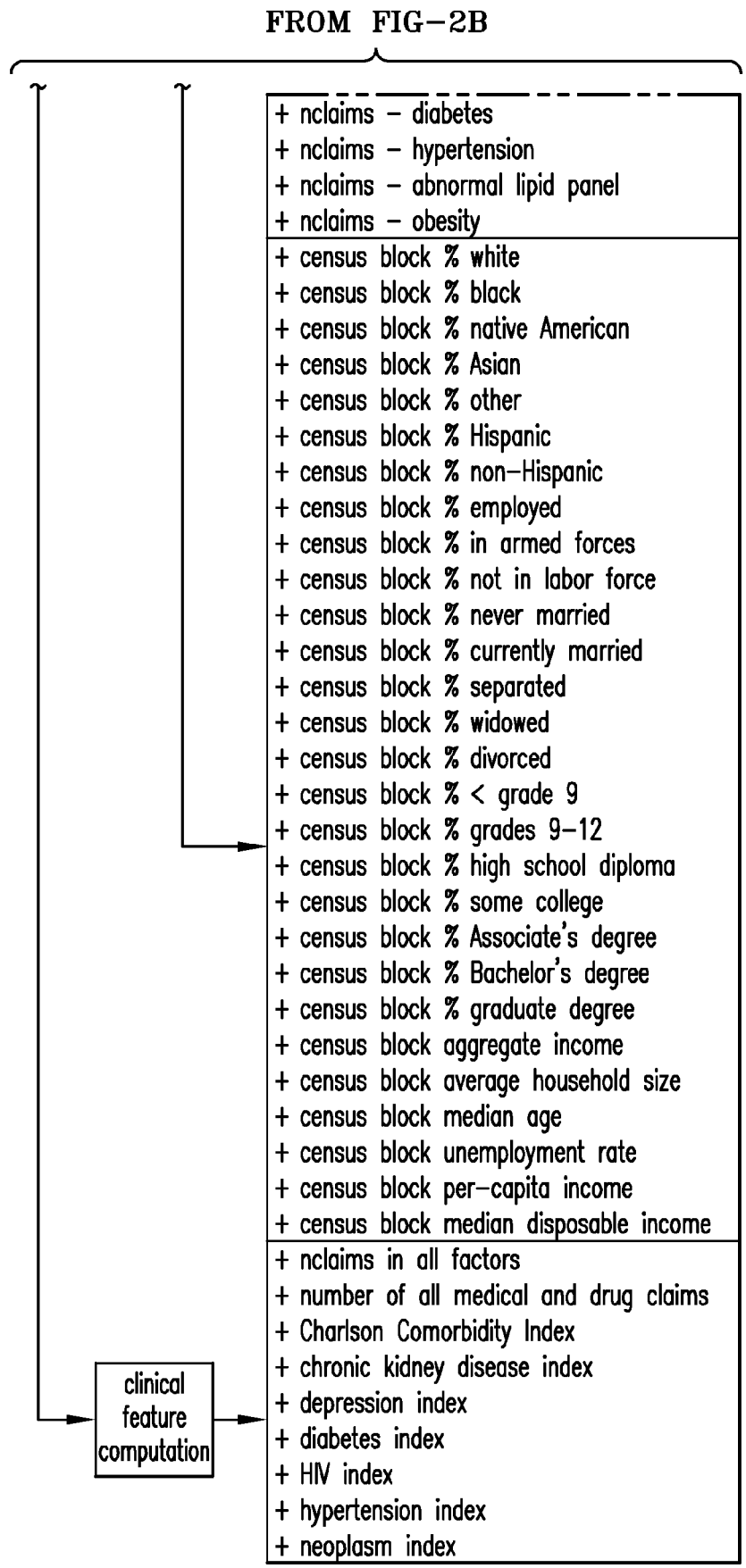

The model features a three-stage architecture as shown in FIG. 1. In the first stage, member and claims data 110 is preprocessed to form the elements of the feature vector 112, 114. There is one instance of the feature vector per member. All claims history for the time period in question is aggregated into a single set of metrics. Claims costs and counts are aggregated by simple summation, while clinical features such as the Charlson Co-morbidity Index and chronic condition tags are computed by attributing score values to the presence of certain ICD-9 diagnosis codes. A schematic representation of the feature vector computation is shown as FIG. 2.

The feature vector is presented in parallel to a set of analysis modules: a support vector machine (SVM) 116; a rule-based engine 118; and a generalized linear model 120. The outputs of these three modules are appended to the input feature vector and the result is presented to the final stage: a set of four regression neural networks 122, 124, 126, 128 that produce an estimated BMI 130.

Support Vector Machine Module

The first module is a support vector machine[6] 116 that performs classification on the data. A SVM (Support Vector Machine) is a high-performance method for classification based on the kernel method for dimensionality increase.

In the example embodiment, the SVM was trained on the training data set. The result is a feature-space hyperplane dividing the two classes: obese and non-obese. The output of this module is the scalar distance of the test sample from the classification boundary, which may be positive or negative.

Rule-Based Module

The second rule-based probability generation module 118 is designed to incorporate clinical input on the probability of obesity for certain combinations of age, sex, and diagnoses. As an example, suppose that the measured rate of obesity in females over 50 with hypertension is 45%. It may be concluded that this percentage is the probability of obesity that can be assigned to this combination of features. If a diagnosis of obesity has ever been made, the probability of obesity is 100%.

Wherever explicit rules have been generated by clinical insight, the corresponding probabilities are output by this module. Otherwise, the observed probabilities that correspond to all combinations of eight variables is read from a look-up table and submitted as the output of this module. In the example embodiment, the eight variables for which probability estimates are available for all combinations are age, sex, diabetes, osteoarthrosis, hypertension, back pain, abnormal weight gain, and abnormal lipids.

Generalized Linear Model

The third module is a generalized linear model, which is a form of multivariate regression. Error minimization techniques are used to find coefficients for a set of logarithmic functions that fit the training data. The output of this model forms another input to the output stage—the regression neural network.

Regression ANN

The final module of the overall model is a feed-forward neural network for regression. The output is a continuous estimate of the BMI 130. This neural network has a single hidden layer of 64 nodes, and a single output. The hidden-layer transfer function is the common differentiable sigmoid function with range −1 to 1, while the output's transfer function is purely linear. All layers include constant bias terms. The network is trained using the familiar back-propagation algorithm.

Branching is implemented in the model. There are four regression networks in use depending on the age and gender of the member (younger male 122, younger female 126, older male 124, or older female 128). In the example embodiment, the age threshold is 45. This threshold is close to the mean age of the training population, so the training set is well distributed among the models. Each of the four networks is identical in architecture (numbers of nodes and layers, for example) with the only differences being internal coefficient values determined during training.

In an example embodiment, the data sources for the model are contained in five files: medical claims; drug claims; member information; HRA responses; and census block statistical data. All data may be provided to the model in either an ODBC-compatible database or in comma-separated text file form.

Several methods were used to assess the performance of the model. The area under a receiver operating characteristic curve is calculated as an estimate of the probability that an obese member will have a higher model output than a non-obese member.[7] Also measured is the accuracy of identification, in percent, for the obese, non-obese, and total population. Determining the accuracy involves setting a recognition threshold to be applied to the output of the classification ANN. A value is selected that identifies approximately 30% of the test population as obese, because this ratio is observed in the training set.

The performance of the obesity inference model is 0.80-0.83 in terms of the area under the ROC curve (AUROC). Variations may be due to differences in the random selection of the training and test data sets.

The model of the present invention is suitable for application to any insured member population for which basic member data and claims history data is available. It can be expected to infer obesity at an 80% level of accuracy across the board. Testing suggests that the model is slightly more accurate for ages over 40.

Although an example embodiment of the obesity inference model based on a feed-forward neural network for regression is described, one of skill in the art would recognize that other software interpolation, simulation, and/or modeling techniques may be used to develop a system and method for estimating levels of obesity in an insured population. For example, various autocorrelation, multivariate regression, linear regression, parallel computational algorithm, fuzzy logic, and pattern recognition, training, and classification techniques may be used and fall within the scope of the claimed invention. A variety of computer models that use height and weight data as well as claim history data and other data as described for training the model may be developed and fall within the scope of the claimed invention.

While certain embodiments of the present invention are described in detail above, the scope of the invention is not to be considered limited by such disclosure, and modifications are possible without departing from the spirit of the invention as evidenced by the claims. For example, data values other than those disclosed herein may be used in the feature vector. Assumptions used in various calculations may be modified in a variety of ways. Other aspects of the architecture and overall model may be varied and fall within the scope of the claimed invention. One skilled in the art would recognize that such modifications are possible without departing from the scope of the claimed invention.

APPENDIX A

Input Feature Vector

This table describes the feature vector that is the input to each of the three modules in the first stage of the model. Features 1 through 4 are removed prior to submission to the model (1 is the unique member identifier ("PGK"), which is a key, and 2 through 4 are used for training).

| # | | Feature | Type |
|---|---|---|---|
| 1 | PERS_GEN_KEY | NOT | text |
| 2 | Actual BMI - latest value | SUBMITTED | int |
| 3 | Actual BMI - average value | TO MODEL | int |
| 4 | Actual BMI - maximum value | | int |
| 5 | # of months covered | | int |
| 6 | Gender | | Boolean |
| 7 | Age | | int |
| 8 | Per member per | Polycystic ovary syndrome | float |
| 9 | month | Fatty liver disease | float |
| 10 | allowed | Dysmetabolic syndrome X | float |
| 11 | charges | Gall bladder disease | float |
| 12 | | Pancreatitis | float |
| 13 | | Abnormal weight gain | float |
| 14 | | Cushing's syndrome | float |
| 15 | | Intestinal malabsorption | float |
| 16 | | Breast cancer | float |
| 17 | | Osteoarthrosis | float |
| 18 | | Hypothyroidism | float |
| 19 | | Goiter | float |
| 20 | | Hypoglycemia | float |
| 21 | | "just not feeling good" | float |
| 22 | | Lumbago | float |
| 23 | | Eating disorders | float |
| 24 | | Sleep problems | float |
| 25 | | Migraines | float |
| 26 | | Head pain | float |
| 27 | | Fat in various body parts | float |
| 28 | | Edema (fluid retention) | float |
| 29 | | Mental stress | float |
| 30 | | Back problems | float |
| 31 | | Fatty breast issues | float |
| 32 | | Other fatty breast | float |
| 33 | | Colon and other cancers | float |
| 34 | | Male breast cancer | float |
| 35 | | Master hormonal neoplasm | float |
| 36 | | Vitamin deficiency | float |
| 37 | | Varicose veins | float |
| 38 | | Lymphangitis | float |
| 39 | | Phlebitis | float |
| 40 | | Hernia tendency | float |
| 41 | | Asthma | float |
| 42 | | Diabetes | float |
| 43 | | Hypertension | float |
| 44 | | Abnormal lipid panel | float |
| 45 | | Obesity | float |
| 46 | Number of claims | Polycystic ovary syndrome | float |
| 47 | | Fatty liver disease | float |
| 48 | | Dysmetabolic syndrome X | float |
| 49 | | Gall bladder disease | float |
| 50 | | Pancreatitis | float |
| 51 | | Abnormal weight gain | float |
| 52 | | Cushing's syndrome | float |
| 53 | | Intestinal malabsorption | float |
| 54 | | Breast cancer | float |
| 55 | | Osteoarthrosis | float |
| 56 | | Hypothyroidism | float |
| 57 | | Goiter | float |
| 58 | | Hypoglycemia | float |
| 59 | | "just not feeling good" | float |
| 60 | | Lumbago | float |
| 61 | | Eating disorders | float |
| 62 | | Sleep problems | float |
| 63 | | Migraines | float |
| 64 | | Head pain | float |
| 65 | | Fat in various body parts | float |
| 66 | | Edema (fluid retention) | float |
| 67 | | Mental stress | float |
| 68 | | Back problems | float |
| 69 | | Fatty breast issues | float |
| 70 | | Other fatty breast | float |
| 71 | | Colon and other cancers | float |
| 72 | | Male breast cancer | float |
| 72 | | Master hormonal neoplasm | float |
| 74 | | Vitamin deficiency | float |
| 75 | | Varicose veins | float |
| 76 | | Lymphangitis | float |
| 77 | | Phlebitis | float |
| 78 | | Hernia tendency | float |
| 79 | | Asthma | float |
| 80 | | Diabetes | float |
| 81 | | Hypertension | float |
| 82 | | Abnormal lipid panel | float |
| 83 | | Obesity | float |
| 84 | Social factors | % white | float |
| 85 | | % black | float |
| 86 | | % native American | float |
| 87 | | % Asian | float |
| 88 | | % other | float |
| 89 | | % Hispanic | float |
| 90 | | % other | float |
| 91 | | % Hispanic | float |
| 92 | | % non-Hispanic | float |
| 93 | | % employed | float |
| 94 | | % in armed forces | float |
| 95 | | % not in labor force | float |
| 96 | | % never married | float |
| 97 | | % currently married | float |
| 98 | | % separated | float |
| 99 | | % widowed | float |
| 100 | | % divorced | float |
| 101 | | % < grade 9 | float |
| 102 | | % grades 9-12 | float |
| 103 | | % high school diploma | float |
| 104 | | % some college | float |
| 105 | | % Associate's degree | float |
| 106 | | % Bachelor's degree | float |
| 107 | | % graduate degree | float |
| 108 | | aggregate income | float |
| 109 | | average household size | float |
| 110 | | median age | float |
| 111 | | unemployment rate | float |
| 112 | | per-capita income | float |
| 113 | Total number of claims in all factors | | int |
| 114 | Total number of all claims (med & drug) | | int |
| 115 | D'Hoore-Charlson Comorbidity Index | | int |
| 116 | Chronic | Chronic kidney disease | int |
| 117 | condition tags | Depression | int |
| 118 | | Diabetes | Int |
| 119 | | HIV | Int |
| 120 | | Hypertension | Int |
| 121 | | Neoplasm | Int |

REFERENCES

1. National Heart Lung and Blood Institute, "Clinical Guidelines on the Identification, Evaluation, and Treatment of Overweight and Obesity in Adults: The Evidence Report," pp. 56 ff., (1998).
2. Gallagher, et al., "How Useful Is Body Mass Index for Comparison of Body Fatness across Age, Sex, and Ethnic Groups?," *Am. J. Epidemiology,* 143:3: 228-239, (1996).
3. National Heart Lung and Blood Institute, "Clinical Guidelines on the Identification, Evaluation, and Treatment of Overweight and Obesity in Adults: The Evidence Report," (1998).

4 Charlson M E, Pompei P, Ales K L, McKenzie C R, "A new method of classifying prognostic comorbidity in longitudinal studies: development and validation," *J Chron Dis,* 40(5): 373-383 (1987).

5 Deyo R A, Cherkin D C, Ciol M A, "Adapting a clinical comorbidity index for use with ICD-9-CM administrative databases," *J Clin Epidemiol,* (45): 613-619 (1992).

6 Fung and Mangasarian, "Proximal Support Vector Machines," *Proc. Knowledge Discovery and Data Mining,* (2001).

7 Bradley, "The Use of the Area Under the ROC Curve in the Evaluation of Machine Learning Algorithms," *Pattern Recognition,* 30:7, pp. 1145-59, (1997).

What is claimed is:

1. A computerized method for estimating obesity in an insured population comprising:
   (a) identifying in a computer a plurality of obesity factors for said insured population;
   (b) identifying in said computer a plurality of members for which height and weight data is not available;
   (c) creating in said computer a feature vector comprising for each of said members for which height and weight data is not available:
      (1) an age;
      (2) a gender;
      (3) claim data for each of said plurality of obesity factors;
      (4) a total number of claims in each of said plurality of obesity factors;
      (5) a total number of claims for all of said obesity factors;
      (6) a co-morbidity score;
      (7) a plurality of chronic condition metrics; and
      (8) a plurality of census metrics;
   (d) presenting said feature vector to a trained obesity inference model in said computer, said model trained according to:
      (1) a body mass index for each member of a subset of said insured population for which height and weight data is available, said body mass index calculated from said height and weight data for each member of said subset;
      (2) feature vector data for each member of said subset of said insured population;
   (e) receiving for output at said computer from said trained obesity inference model an estimated body mass index for said member of said insured population.

2. The computerized method of claim 1 wherein said claim data for each of a plurality of obesity factors comprises cost intensity data.

3. The computerized method of claim 2 wherein said cost intensity data for each obesity factor area is calculated as total costs for a period under consideration normalized by a number of months said member is in said insured population.

4. The computerized method of claim 1 wherein said obesity factors are selected from the group consisting of:
   polycystic ovary syndrome, fat in various parts of the body, fatty liver disease, edema, dysmetabolic syndrome X, mental stress, depression and anxiety, gall bladder disease, back problems, pancreatitis and bile duct obstruction, fatty breast issues, abnormal weight gain, Cushing's syndrome, colon and associated cancers, intestinal malabsorption, male breast cancer, breast cancer, neoplasm of the master hormonal gland, osteoarthrosis, vitamin deficiency and absorption problems, hypothyroidism, varicose veins, goiter, lymphangitis, hypoglycemia and other glycogen problems, phlebitis, hernia tendency, lumbago, asthma, eating disorders, diabetes, sleep problems, hypertension, migraines, abnormal lipid panel, head pain, and an obesity diagnosis.

5. The computerized method of claim 1 wherein said chronic condition metrics are selected from the group consisting of chronic kidney disease, depression, diabetes, HIV, hypertension, and cancer.

6. The computerized method of claim 1 wherein said census metrics comprise averages in census block areas for racial distribution, ethnicity, income, marital status, education, employment, and family size.

7. The computerized method of claim 1 wherein said height and weight data for said members in said subset of said insured population is obtained from health risk assessment data provided by said members.

8. A computerized system for estimating obesity in an insured population, comprising:
   (a) memory at a computer for storing for a member of said insured population member health data exclusive of height and weight data and for said member a feature vector comprising:
      (1) an age;
      (2) a gender;
      (3) claim data for each of a plurality of obesity factors;
      (4) a total number of claims in each of said plurality of obesity factors;
      (5) a total number of claims for all of said obesity factors;
      (6) a co-morbidity score;
      (7) a plurality of chronic condition metrics; and
      (8) a plurality of census metrics;
   (b) an executable process at said computer configured to:
      (1) present said feature vector in parallel to a trained obesity inference model wherein said model is trained according to:
         (A) a body mass index for each member of a subset of said insured population for which height and weight data is available, said body mass index calculated from said height and weight data for each member of said subset;
         (B) feature vector data for each member of said subset of said insured population;
      (2) receive for output at said computer from said obesity inference model an estimated body mass index for said member of said insured population.

9. The computerized system of claim 8 wherein said claim data for each of a plurality of obesity factors comprises cost intensity data.

10. The computerized system of claim 9 wherein said cost intensity data for each obesity factor area is calculated as total costs for a period under consideration normalized by a number of months said member is in said insured population.

11. The computerized system of claim 8 wherein said obesity factors are selected from the group consisting of:
   polycystic ovary syndrome, fat in various parts of the body, fatty liver disease, edema, dysmetabolic syndrome X, mental stress, depression and anxiety, gall bladder disease, back problems, pancreatitis and bile duct obstruction, fatty breast issues, abnormal weight gain, Cushing's syndrome, colon and associated cancers, intestinal malabsorption, male breast cancer, breast cancer, neoplasm of the master hormonal gland, osteoarthrosis, vitamin deficiency and absorption problems, hypothyroidism, varicose veins, goiter, lymphangitis, hypoglycemia and other glycogen problems, phlebitis, hernia tendency, lumbago, asthma, eating disorders, diabetes, sleep problems, hypertension, migraines, abnormal lipid panel, head pain, and an obesity diagnosis.

12. The computerized system of claim 8 wherein said chronic condition metrics are selected from the group consisting of chronic kidney disease, depression, diabetes, HIV, hypertension, and cancer.

13. The computerized system of claim 8 wherein said census metrics comprise averages in census block areas for racial distribution, ethnicity, income, marital status, education, employment, and family size.

14. The computerized system of claim 8 wherein said height and weight data for said members in said subset of said insured population is obtained from health risk assessment data provided by said members.

15. A computerized method for estimating obesity in an insured population comprising:
  (a) identifying in a computer a plurality of obesity factor areas for said insured population;
  (b) creating in said computer a feature vector comprising for each member of said insured population:
    (1) demographic data;
    (2) claim data for each of said plurality of obesity factor areas; and
    (3) a plurality of census metrics;
  (c) presenting said feature vector in parallel to modules in said computer comprising:
    (1) a support vector machine that divides said feature vector data into classes and generates a first output of a distance from classification boundaries for said classes;
    (2) a rule-based engine that generates a second output of a probability of obesity based on said feature vector data;
    (3) a generalized linear model that generates a third output of a continuous estimate of body mass index;
  (d) appending in said computer to said feature vector said first output from said support vector machine, said second output from said rule-based engine, and said third output from said generalized linear model;
  (e) presenting at said computer said feature vector to a plurality of regression neural networks; and
  (f) receiving for output at said computer from said regression neural networks an estimated body mass index for said insured population.

16. The computerized method of claim 15 wherein said demographic data for each member comprises an age and a gender.

17. The computerized method of claim 15 wherein said claim data for each of a plurality of obesity factor areas comprises cost intensity data for claims in each of said plurality of obesity factor areas, a total number of claims in each of said plurality of obesity factor areas, and a total number of claims for all of said obesity factor areas.

18. The computerized method of claim 17 wherein said cost intensity data for each obesity factor area is calculated as total costs for a period under consideration normalized by a number of months said member is in said insured population.

19. The computerized method of claim 15 wherein said plurality of regression neural networks comprises four regression networks each of which relates to an age range, defined by an age threshold, and gender.

20. The computerized method of claim 19 wherein said age threshold is a mean age in a training population for said regression neural networks.

21. The computerized method of claim 15 wherein said obesity factor areas are selected from the group consisting of: polycystic ovary syndrome, fat in various parts of the body, fatty liver disease, edema, dysmetabolic syndrome X, mental stress, depression and anxiety, gall bladder disease, back problems, pancreatitis and bile duct obstruction, fatty breast issues, abnormal weight gain, Cushing's syndrome, colon and associated cancers, intestinal malabsorption, male breast cancer, breast cancer, neoplasm of the master hormonal gland, osteoarthrosis, vitamin deficiency and absorption problems, hypothyroidism, varicose veins, goiter, lymphangitis, hypoglycemia and other glycogen problems, phlebitis, hernia tendency, lumbago, asthma, eating disorders, diabetes, sleep problems, hypertension, migraines, abnormal lipid panel, head pain, and an obesity diagnosis.

22. The computerized method of claim 15 wherein said regression neural networks are trained using actual body mass index data for members in a subset of said insured population.

23. The computerized method of claim 22 wherein said actual body mass index data is calculated from height and weight data for said members in said subset of said insured population.

24. The computerized method of claim 23 wherein said height and weight data for said members in said subset of said insured population is obtained from health risk assessment data provided by said members.

25. The computerized method of claim 15 wherein said feature vector further comprises for each member a co-morbidity score and a plurality of chronic condition metrics.

* * * * *